US011891948B1

(12) United States Patent
Stiles

(10) Patent No.: US 11,891,948 B1
(45) Date of Patent: Feb. 6, 2024

(54) MOVING WALL POSITIVE DISPLACEMENT TURBINE SYSTEM

(71) Applicant: David Stiles, Fulshear, TX (US)

(72) Inventor: David Stiles, Fulshear, TX (US)

( * ) Notice: Subject to any disclaimer, the term of this patent is extended or adjusted under 35 U.S.C. 154(b) by 0 days.

(21) Appl. No.: 18/103,466

(22) Filed: Jan. 30, 2023

Related U.S. Application Data

(60) Provisional application No. 63/344,240, filed on May 20, 2022.

(51) Int. Cl.
*F01C 1/344* (2006.01)
*F01C 21/10* (2006.01)
*F02B 53/10* (2006.01)

(52) U.S. Cl.
CPC ............ *F02B 53/10* (2013.01); *F01C 21/104* (2013.01); *F01C 1/3446* (2013.01); *F02B 2730/012* (2013.01)

(58) Field of Classification Search
CPC ............................ F01C 21/104; F01C 1/3446
See application file for complete search history.

(56) References Cited

FOREIGN PATENT DOCUMENTS

| | | | | | |
|---|---|---|---|---|---|
| DE | 102015110734 | A1 | * | 1/2017 | |
| WO | WO-9600846 | A1 | * | 1/1996 | ............ F01C 21/104 |
| WO | WO-2021255224 | A1 | * | 12/2021 | |

* cited by examiner

*Primary Examiner* — Ngoc T Nguyen
(74) *Attorney, Agent, or Firm* — Richard Eldredge

(57) ABSTRACT

A moving wall positive displacement turbine system, or moving wall engine, utilizes the relative rotation of a ring, a central body, and a housing with respect to each other to generate power, where the ring is concentrically positioned in a channel between the central body and the housing. The housing and central body remain stationary while the ring rotates within the channel. The channel has low friction walls on either side to reduce friction between rotating components. The ring has a series of vanes passing through it and pivotally attached on each side to the low friction walls in the housing to compress an air-fuel mixture prior to combustion. The system is able to compress and combust an air-fuel mixture to generate direct rotational energy.

9 Claims, 4 Drawing Sheets

MOVING WALL POSITIVE DISPLACEMENT TURBINE SYSTEM

BACKGROUND

1. Field of the Invention

The present invention relates generally to engine systems, and more specifically, to a cyclical displacement engine system that produces movement through the consumption of fuel.

2. Description of Related Art

Engine systems are well known in the art and are effective means to generate power for use in vehicles, tools, and the like. For example, FIG. 1 depicts a conventional piston engine system 101 having a block 103 with a bore 105, wherein a piston 107 is driven by a rod 109. During use, air is placed in the bore 105 and the piston 107 increases the pressure of the air by mechanical force as depicted by motion A, applied thereto by the rod 109. Once the piston 107 compresses the air, fuel is mixed via the injection port 111. The mixture is then ignited, causing the piston 107 to be forced back down, thus generating power.

One of the problems commonly associated with system 101 is limited efficiency. For example, the linear movement of the piston and rod must be converted to rotational energy by a shaft, gears, or the like, causing losses in the system.

Accordingly, although great strides have been made in the area of piston engine systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
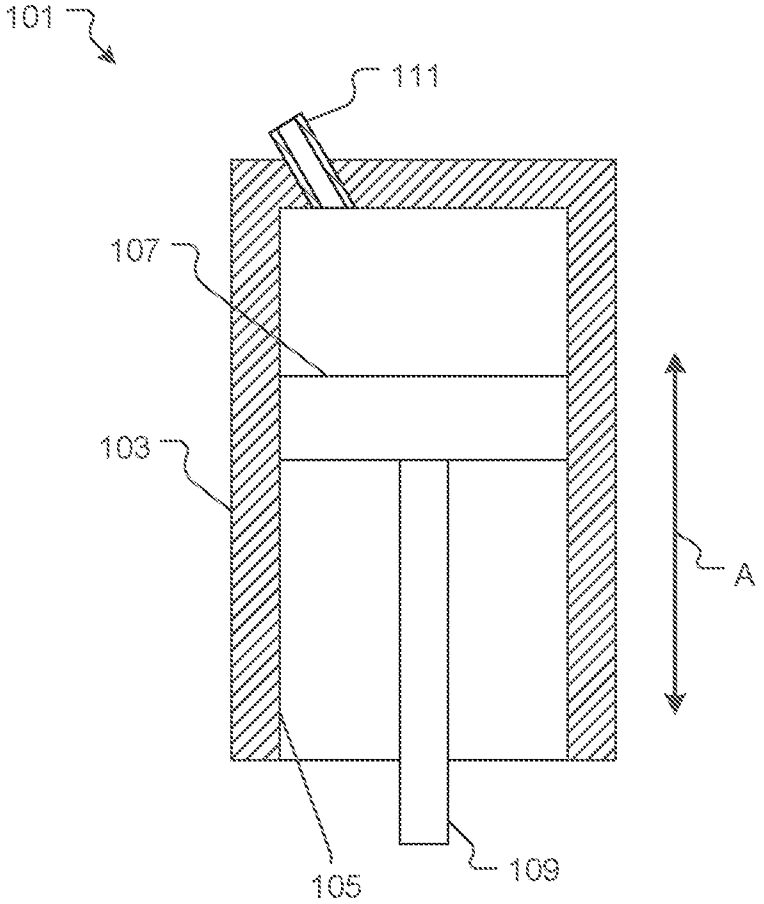
FIG. 1 is a cross-sectional front view of a common piston compressor system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional piston engine systems. Specifically, the invention of the present application provides continuous direct rotational power generation. This and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
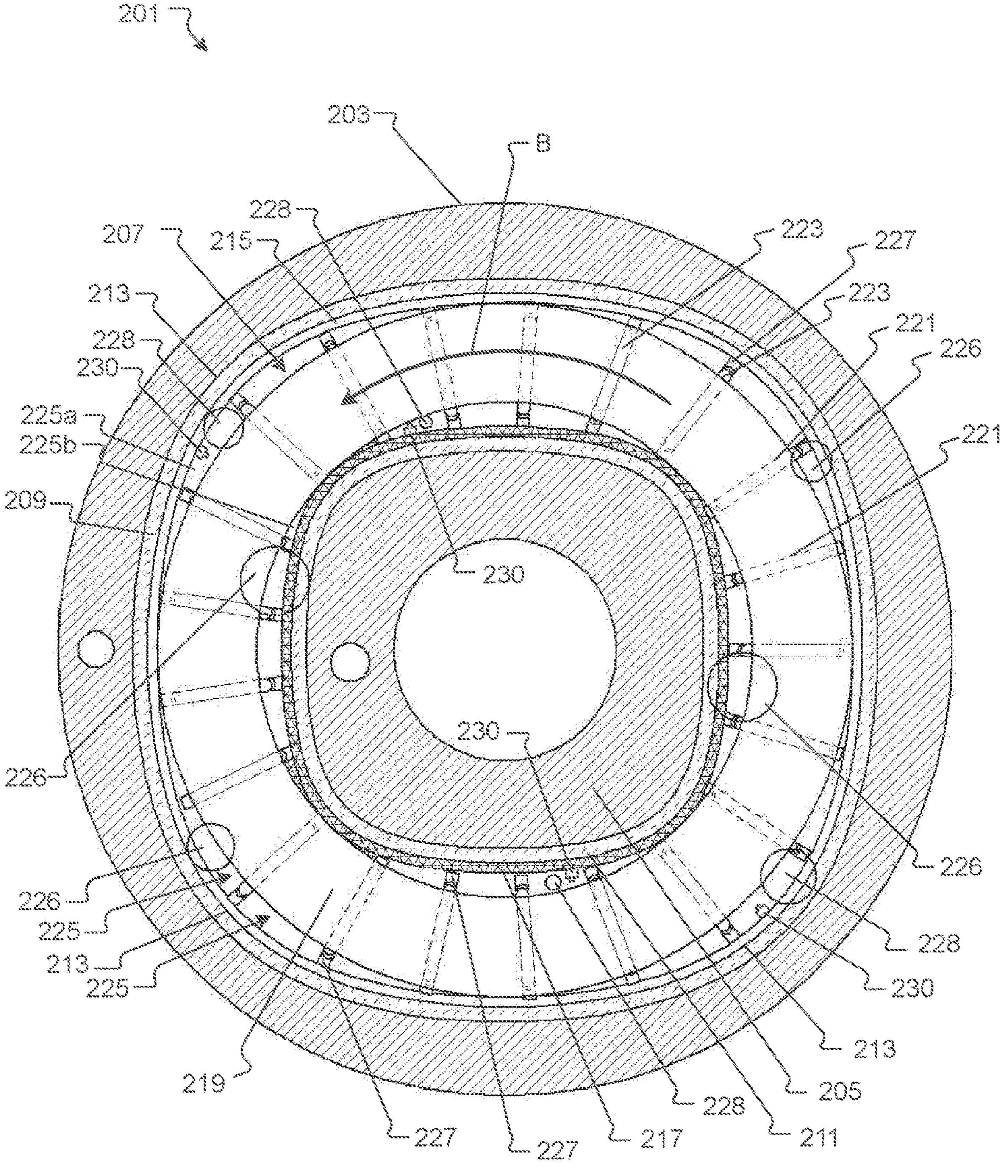
FIG. 2 is a cross-sectional top view of a moving wall positive displacement turbine system in accordance with a preferred embodiment of the present application.

Referring now to the drawings wherein like reference characters identify corresponding or similar elements throughout the several views, FIG. 2 depicts a cross-sectional top view of a moving wall positive displacement turbine system 201 in accordance with a preferred embodiment of the present application. The present invention may also be referred to and similarly function as a moving wall engine. It will be appreciated that system 201 overcomes one or more of the above-listed problems commonly associated with conventional piston compressor systems.

In the contemplated embodiment, system 201 includes a housing 203 and a central body 205 positioned concentrically within the housing 203. A channel 207 is delineated between a first running surface 209 of the housing 203 and a second running surface 211 of the central body 205, wherein the first running surface 209 and the second running surface 211 are each contoured according to a polygonal profile with a plurality of lobes 213. In various embodiments, the polygonal profile may comprise three or more radially equidistant lobes 213. A first low friction wall 215 is positioned adjacent to the first running surface 209 and a second low friction wall 217 is positioned adjacent to the second running surface 211. The first low friction wall 215 is configured to move relative to and minimize friction against the first running surface 209 of the housing 203, and the second low friction wall 217 is configured to move relative to and minimize friction against the second running surface 211 of the central body 205.

A vane ring 219 is positioned within the channel 207 having a plurality of radial slots 221. A plurality of vanes 223 is slidingly attached within and passes through the plurality of radial slots 221, wherein the plurality of vanes 223 is pivotally attached between the first low friction wall 215 and the second low friction wall 217.

The first low friction wall 215, the second low friction wall 217, the vane ring 219, and the vanes 223 form spaces 225 with variable geometry. The spaces 225 are in fluid communication with a reservoir, or other suitable fluid input means. More particularly, the spaces 225 are in intermittent fluid communication with a fluid reservoir through intermittently accessible ports of one or more end plates as discussed hereinafter.

The housing 203 and the central body 205 are made of a porous material, wherein a high-pressure fluid is injected into the porous material of the housing 203 to provide a low friction interface between the housing 203 and the first low friction wall 215. Similarly, a high-pressure fluid is injected into the porous material of the central body 205 to provide a low friction interface between the central body 205 and the second low friction wall 217. In the contemplated embodiments, the first low friction wall 215 and the second low friction wall 217 are each a flexible membrane.

The injection of the high-pressure fluid into the porous material of the housing 203 and central body 205 serves to create a gas film between the membranes and their respective running surfaces, while within the spaces 225, pressure buildup conforms the membranes to the geometry of the polygonal profile. These opposing pressures can be balanced so that the membranes experience very little load, and thus very low friction between the low friction walls 215, 217 and the running surfaces 209, 211. This arrangement makes very high rotational speeds possible with the present invention.

It should be appreciated that one of the unique features believed characteristic of the present application is that the spaces 225 enable continuous, cyclical change of pressure on a fluid received from the fluid reservoir. As one space 225 contracts, another will begin the cycle, enabling a constant amount of power to be continually produced.

The fluid is injected, sucked via pressure, or otherwise transposed into the spaces 225 to have its pressure altered as the housing 203 and central body 205 and the vane ring 219 experience rotation relative to each other, changing the geometry of the spaces through compression and/or expansion. More particularly, the housing 203 and central body 205 are rotationally locked together and experience rotation relative to the vane ring 219. Further, one or more of the spaces 225 have associated fluid intake ports 226. Not all of the spaces 225 may require fluid intake ports. It is contemplated that the quantity of fluid intake ports 226 desired may correspond to the number of lobes 213, though the number and location of fluid intake ports 226 may vary in different embodiments. In some embodiments, the fluid intake ports 226 may more particularly be fuel injection ports.

For example, the exemplary embodiment shown in FIG. 2 has four lobes 213 and two fluid intake ports 226 per revolution, per outer/inner side of the vane ring 219; thus, each space 225 experiences two cycles per revolution, each cycle progressing through intake, compression, combustion, and exhaust.

In the contemplated embodiment, in use, a fluid, more particularly an air-fuel mixture, is injected into one or more spaces 225 at a low pressure through one or more corresponding fluid intake ports 226. As previously noted, fluid transposition into the spaces 225 should not be limited to injection, and may be accomplished through suction, or any other relevant means. The housing 203 and the central body 205 remain stationary while the vane ring 219, along with the plurality of vanes 223 rotates as depicted by motion B. Since the vanes 223 are attached between the first low friction wall 215 and the second low friction wall 217, the low friction walls 215, 217 necessarily rotate with the plurality of vanes 223 and the vane ring 219.

While experiencing motion B, the size of each space 225 alternatingly contracts and expands due to the changing distance between the vane ring 219 and the running surfaces defined by the polygonal profile. Meanwhile, the vanes 223 experience periodic adjustment of their position by sliding in or out of the vane ring 219 as determined by their contact with the first low friction wall 215 and the second low friction wall 217, which conform to the periodically undulating polygonal profile of the first running surface 209 and second running surface 211.

As this rotation B occurs, the changing size of the spaces 225 compresses the injected air-fuel mixture prior to combustion, which adds energy to the rotational momentum of the vane ring 219.

As the pressure changes, evacuation ports 228 are opened, or uncovered by the rotation, and the combusted air-fuel mixture exits through the evacuation port 228.

Due to the difference in shape between the annular vane ring 219 and the polygonal profile, a radial vector normal to the vane ring 219 intersects the polygonal profile at a range of angles during a revolution, the range being symmetrically centered around the normal angle between the vector and the polygonal profile. Thus, the vanes 223 cannot rigidly terminate between the first low friction wall 215 and the second low friction wall 227 and must be permitted a certain amount of angular variation in their orientations relative to the low friction walls 215, 217.

To this end, in the contemplated embodiment, the first low friction wall 215 and the second low friction wall 217 each comprise a plurality of pivot points 227, wherein the plurality of vanes 223 is pivotally attached between the pivot points 227 of the first low friction wall 215 and the second low friction wall 217. The first low friction wall 215 and the second low friction wall 217 are offset by the length of the vanes 223.

In the contemplated embodiment, a full cycle for a single space 225 is a half-revolution of 180 degrees, such that each space 225 undergoes two full cycles per revolution. It should further be noted that two spaces 225 exist angularly between any two vanes 223—an outer space 225*a* disposed between the first low friction wall 215 and the outer diameter of the vane ring 219, and an inner space 225*b* disposed between the second low friction wall 217 and the inner diameter of the vane ring 219.

Further, as previously noted, there are effectively two separate spaces 225*a*, 225*b* between each pair of vanes 223, creating an outer set of spaces 225*a* and an inner set of spaces. Each of the outer set of spaces 225*a* and the inner set of spaces 225*b* has its own set of fluid intake ports 226 and discharge ports 228. As can be seen in FIG. 2, beginning in the upper-right quadrant and proceeding clockwise, the outer set of spaces 225*a* has a fluid intake port 226, followed by a discharge port 228 at the lower-right, a fluid intake port 226 at the lower-left, and a discharge port 228 at the upper-left.

Similarly, for the inner set of spaces 225*b*, a fluid intake port 226 can be seen at the right of FIG. 2, followed by a discharge port 228 near the bottom, a fluid intake port 226 at the left, and another discharge port 228 near the top.

Figure 3:
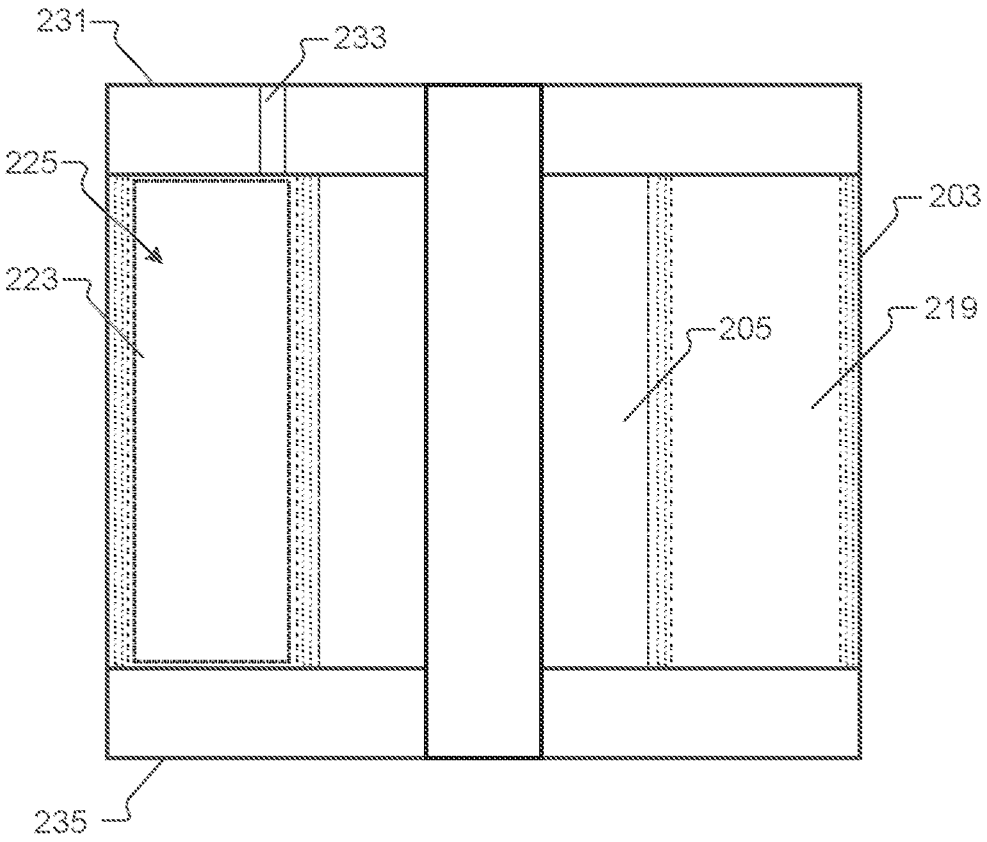
FIG. 3 is an illustrative cross-sectional side view of FIG. 2.

In the contemplated embodiment, referring now to FIG. 3, an inlet end plate 231 and a discharge end plate 235 are further comprised and are rotatably coupled opposite each other to the central body 205 and the housing 203, such that the central body 205, housing 203, low friction walls, vane ring 219, and vanes 223 are positioned between the inlet end plate 231 and the discharge end plate 235.

The inlet end plate 231 comprises the plurality of fluid intake ports 233, wherein the plurality of fluid intake ports 233 is configured to intermittently transpose fluid, through injection, suction, or other suitable means, into the spaces 225 to have its pressure altered as the fluid intake ports 233 pass sequentially over the spaces 225 during the rotation. More specifically, the fluid intake ports 223 may radially positioned to correspond appropriately to a rotary engine combustion cycle. The fuel injection ports 223 should be radially timed to inject the air-fuel mixture into the spaces 225 prior to compression in preparation for combustion, followed by expansion and exhaust.

The discharge end plate has ports 228 that discharge the combusted fuel-air mixture to a low pressure outlet.

Through the rotational motion B, the air-fuel mixture is compressed within the spaces 225 by the vanes 223 and the mixture is combusted, either through heat of compression or spark ignition, depending on the type of fuel source. In some embodiments, an igniter 230, such as a spark plug or other suitable ignition means, may be utilized to initiate combustion. The combusted gasses expand through an expander section of the polygonal profile, corresponding to one or more spaces 225 radially subsequent to the combustion space(s) 225, and are discharged to the low pressure side, or exhaust side, of the system 201 through the discharge ports 228 of the discharge end plate 235. The vanes 223 fully exhaust the gas and the cycle starts with the suction stroke again.

The expansion between the vanes and the polygonal profile generates high torque and rotation of the central body 205. The thrust is handled by the porous material of the stationary housing 203 and the central body 205. High pressure gas is ported to this porous material to balance thrust conditions. The expander can be coupled to any machine requiring power. The near frictionless movement enabled by the flexible membranes allows the moving wall engine to handle very high rotating speeds and has an extremely high power density due to its multiplicity of vanes. The engine can be used as a single stage, or multiple moving wall expanders can be stacked together on the central body 205 to optimize the expansion efficiency and take advantage of the very high compression ratio cycle. This engine can be used from ambient pressure to very high inlet pressures. The increased pressure increases the power density and thermal efficiency.

Figure 4:
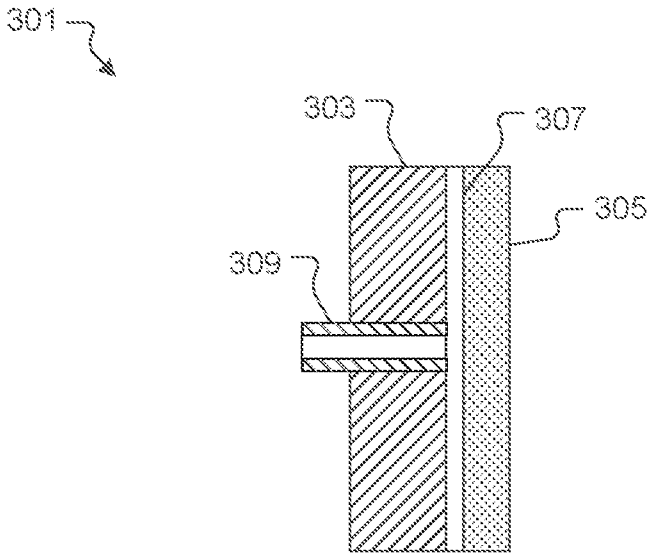
FIG. 4 is a cross-sectional side view of the low friction wall of FIG. 2.

Referring now to FIG. 4, an embodiment of the low friction walls 215, 217 is depicted. Embodiment 301 includes the wall of the channel 303 having a flexible membrane 305 attached thereto with a pocket 307 of fluid between. The pocket 307 is filled by a port 309 that supplies pressurized fluid to the wall 303 and pocket 307. It is contemplated that the housing 203 or the wall of the channel 303 are made of a porous material to allow for even distribution of the pressurized fluid.

Another unique feature believed characteristic of the present application is that the pressurized fluid that fills the pocket 307 of the low friction walls 215, 217 allow for altering the force needed to seal the spaces 225 and reduce the friction of the vanes 223 on the channel 207.

Figure 5:
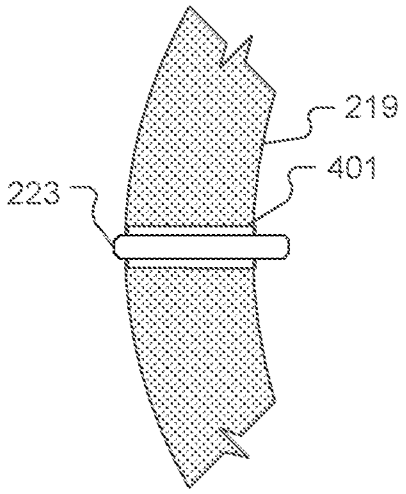
FIG. 5 is a cross-sectional top view of the ring and vanes of FIG. 2.
Figure 6:
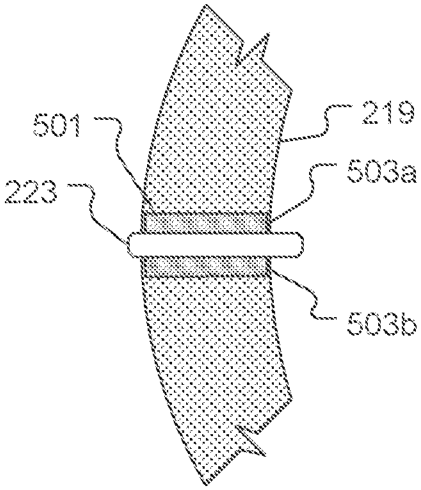
FIG. 6 is a cross-sectional top view of an alternative embodiment of the ring and vanes of FIG. 2.

Referring now to FIG. 5, the vane ring 219 and vanes 223 are depicted. The ring 219 has a slot 401 passing therethrough to allow the vane 211 to slide with respect to it. While the gap between the vane ring 219 and vane 223 is depicted as large it is contemplated that this gap will be very small if it exists. It is contemplated as depicted by FIG. 6, and will be appreciated that the vane ring 219 could have a large slot 501 and that on each side a low friction wall 503 is attached to further reduce the friction of the vanes 211.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A moving wall positive displacement turbine system comprising:
- a housing and
- a central body positioned concentrically within the housing, wherein a channel is delineated between a first running surface of the housing and a second running surface of the central body, wherein the first running surface and the second running surface are each contoured according to a polygonal profile with a plurality of lobes;
- a first low friction wall being attached to the first running surface;
- a second low friction wall being attached to the second running surface;
- a ring positioned within the channel having a plurality of radial slots;
- a plurality of vanes slidingly attached within and passing through the plurality of radial slots, wherein the plurality of vanes is pivotally attached between the first low friction wall and the second low friction wall;
- wherein the first low friction wall, the second low friction wall, the ring and the vanes form spaces with variable geometry; and
- wherein the housing and the central body are rotationally coupled; and
- a plurality of fuel injection ports being configured to inject an air-fuel mixture into the spaces for combustion as the housing and central body and the ring experience rotation relative to each other.

2. The moving wall positive displacement turbine system of claim 1 further comprising:
- the housing and the central body being made of a porous material,
- wherein a high-pressure fluid is injected into the porous material of the housing to provide a low friction interface between the housing and the first low friction wall, and wherein a high-pressure fluid is injected into the porous material of the central body to provide a low friction interface between the central body and the second low friction wall.

3. The moving wall positive displacement turbine system of claim 1, wherein the first low friction wall and the second low friction wall are flexible membranes.

4. The moving wall positive displacement turbine system of claim 1, wherein the polygonal profile comprises three or more radially equidistant lobes.

5. The moving wall positive displacement turbine system of claim 1, wherein the first low friction wall and the second low friction wall are offset by the length of the vanes.

6. The moving wall positive displacement turbine system of claim 1, wherein the first low friction wall and the second low friction wall each comprise a plurality of pivot points, and wherein the plurality of vanes is pivotally attached between the pivot points of the first low friction wall and the second low friction wall.

7. The moving wall positive displacement turbine system of claim 1, an inlet end plate and a discharge end plate rotatably coupled to the central body and the housing, wherein the central body, housing, low friction walls, ring, and vanes are positioned between the inlet end plate and the discharge end plate.

8. The moving wall positive displacement turbine system of claim 7 further comprising:

the inlet end plate comprising the plurality of fuel injection ports corresponding to the number of lobes of the polygonal profile, wherein the plurality of fuel injection ports is configured to inject the air-fuel mixture into the spaces for combustion.

9. The moving wall positive displacement turbine system of claim 1, wherein the housing and the central body are held stationary and wherein the ring is configured to rotate relative to the housing and the central body, and wherein an inlet end plate and a discharge end plate are ported so that high pressure gas is introduced into fuel injection ports of the inlet end plate and expanded to the discharge port at a fixed expansion ratio.

* * * * *